(12) United States Patent
Sakamoto

(10) Patent No.: US 11,226,786 B2
(45) Date of Patent: Jan. 18, 2022

(54) PRINT CONTROL SYSTEM AND CONTROL METHOD

(71) Applicant: CANON KABUSHIKI KAISHA, Tokyo (JP)

(72) Inventor: Takahiro Sakamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/166,878

(22) Filed: Feb. 3, 2021

(65) Prior Publication Data

US 2021/0157546 A1    May 27, 2021

Related U.S. Application Data

(63) Continuation of application No. 16/595,245, filed on Oct. 7, 2019, now Pat. No. 10,949,165.

(30) Foreign Application Priority Data

Oct. 11, 2018 (JP) .............................. JP2018-192957

(51) Int. Cl.
*G06F 3/12* (2006.01)
*G06F 3/16* (2006.01)

(52) U.S. Cl.
CPC ............ *G06F 3/167* (2013.01); *G06F 3/1256* (2013.01); *G06F 3/1257* (2013.01)

(58) Field of Classification Search
CPC ................................ G06F 3/167; G06F 3/1256
See application file for complete search history.

(56) References Cited

U.S. PATENT DOCUMENTS

2019/0068810 A1\* 2/2019 Okamoto .............. G06F 3/1204
2019/0156825 A1\* 5/2019 Shiga ...................... G10L 15/22

FOREIGN PATENT DOCUMENTS

EP           3582482 A1 ‡ 12/2019 ......... H04N 1/00403
JP      2015-100020 A  ‡  5/2015

OTHER PUBLICATIONS

Sarah Murry, HP says hello to voice-activated printing, https://garage.ext.hp.com/us/en/news/hp-says-hello-to-voice-activated-printing-.html, XP055639644, Jan. 31, 2018, [retrieved from internet on Nov. 6, 2019], pp. 1-5.‡
HP Printer Skill for Microsoft Cortana: HP Official Site, https://web.archive.org/web/20180210164114/https://www8.hp.com/us/en/printers/cortana.html?jumpid=va_vjcxti45yd, xP055639594, Feb. 10, 2018, [retrieved from Internet on Nov. 6, 2019], pp. 1-5.‡
HP Printers—Printing with Cortana: HP Customer Support, https://support.hp.com/us-en/document/c05604191, XP055639607, Oct. 4, 2017, [retrieved from internet on Nov. 6, 2019], pp. 1-10.‡

\* cited by examiner
‡ imported from a related application

*Primary Examiner* — Ibrahim Siddo
(74) *Attorney, Agent, or Firm* — Canon U.S.A., Inc. IP Division

(57) ABSTRACT

In a case where based on a receipt by a voice device of an utterance requesting a use of a print content generation service, the print content generation service generates a print content, and from first and second print services, the first print service is identified, a print control system acquires the print content generated by the print content generation service. Then, the print control system identifies print setting information for executing a printing process based on the print content.

24 Claims, 9 Drawing Sheets

PRINT CONTROL SYSTEM AND CONTROL METHOD

CROSS REFERENCE TO RELATED APPLICATIONS

The present application is a continuation of U.S. patent application Ser. No. 16/595,245 filed on Oct. 7, 2019, which claims priority from Japanese Patent Application No. 2018-192957, filed Oct. 11, 2018, all of which are hereby incorporated by reference herein in their entirety.

BACKGROUND OF THE INVENTION

Field of the Invention

The present invention relates to a print control system and a control method.

Description of the Related Art

Japanese Patent Application Laid-Open No. 2015-100020 discusses a technique in which a print instruction is executed by pressing a print button displayed on a mobile terminal.
In Japanese Patent Application Laid-Open No. 2015-100020, however, to give an instruction to perform printing, a user needs to press the print button. In recent years, printing apparatuses have been used in various ways, and a technique for further improving operability related to printing is required.

SUMMARY OF THE INVENTION

According to an aspect of the present invention, a print control system includes a printing apparatus and a print management server configured to communicate with a voice device management server. The print management server includes an acquisition unit configured to acquire print content generated by a print content generation service in a case where, based on a first print service being identified from a first print service and a second print service and on a receipt by a voice device of an utterance requesting a use of the print content generation service, the print content generation service generates the print content, wherein the first print service corresponds to the printing apparatus, and the second print service, which is different from the first print service, corresponds to another printing apparatus different from the printing apparatus; and an identifying unit configured to identify print setting information for executing a printing process based on the print content generated by the print content generation service, wherein in a state where a first print content generation service, for generating a first print content, and a second print content generation service, for generating a second print content, are registered as the print content generation service in the voice device management server, print setting information identified to execute a printing process based on the first print content generated by the first print content generation service is the same as print setting information identified to execute a printing process based on the second print content generated by the second print content generation service, and the printing apparatus includes a print control unit configured to execute the printing process for a print job based on the print content and the print setting information.

Further features of the present invention will become apparent from the following description of exemplary embodiments with reference to the attached drawings.

DESCRIPTION OF THE EMBODIMENTS

With reference to the attached drawings, exemplary embodiments of the present invention will be described in detail below. The following exemplary embodiments do not limit the present invention according to the appended claims, and not all the combinations of the features described in the exemplary embodiments are essential for a method for solving the issues in the present invention. Each of the embodiments of the present invention described below can be implemented solely or as a combination of a plurality of the embodiments. Also, features from different embodiments can be combined where necessary or where the combination of elements or features from individual embodiments in a single embodiment is beneficial.

First, the configuration of a printing system as the basis of the present invention is described.

Figure 1:
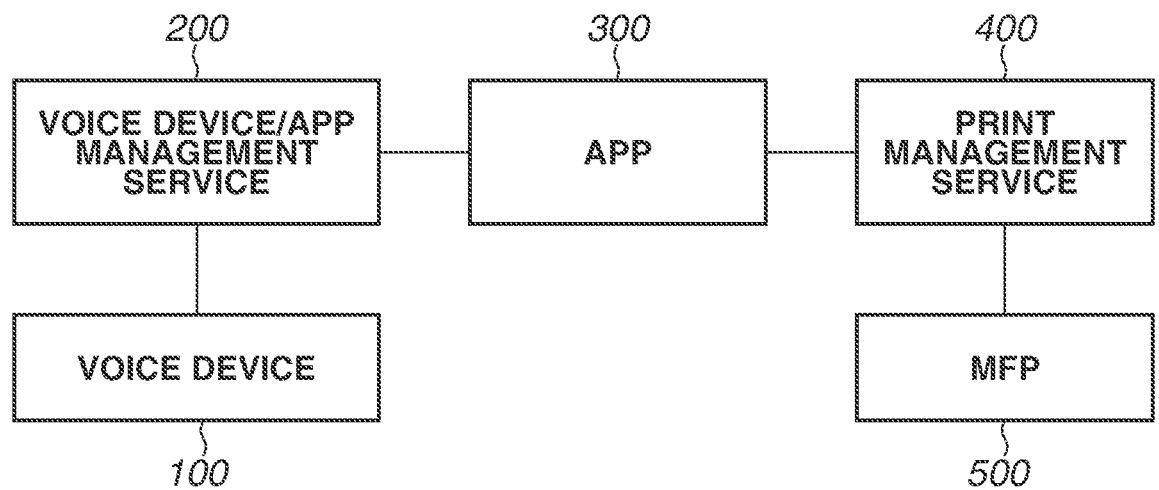
FIG. 1 is a diagram illustrating an example of a configuration of a printing system.

FIG. 1 is a block diagram illustrating an example of the configuration of a printing system according to a first exemplary embodiment. The printing system illustrated in FIG. 1 includes a voice device 100, a voice device/app management service 200, an app 300, a print management service 400, and a multifunction peripheral (MFP) 500. In the present exemplary embodiment, the voice device 100, the voice device/app management service 200, the app 300, the print management service 400, and the MFP 500 are connected to each other via the Internet. First, the voice device 100 can transmit, via a network, voice data corresponding to a voice uttered by a user, and can also output voice data received via a network as a voice. The voice device/app management service 200 has the function of managing the voice device 100 and also the function of receiving utterance data from the voice device 100 or transmitting utterance data to the voice device 100. The utterance data may be voice data or text data. The app 300 is started according to an instruction from the voice device/app management service 200. The app 300 can read print content according to the content of a request from the voice device/app management service 200, and can also generate text information including the content of a message for the user. The print management service 400 can communicate with the MFP 500 via the Internet. Thus, the print management service 400 can remotely give a print instruction to the MFP 500. The voice device/app management service 200, the app 300, and the print management service 400 operate on servers (or server groups) prepared by respective service providers. Thus, the voice device/app management service 200 is occasionally referred to as the "voice device/app management server (or voice device management server) 200", and the print management service 400 is occasionally referred to as the "print management server 400". The app 300 and the print management service 400 may be provided by the same server (or server group). A system including the app 300 and the print management service 400 and capable of generating an instruction for a printing process to be executed by the MFP 500 is occasionally referred to as a "print control system". The MFP 500 may perform printing by an inkjet method, or may perform printing by an electrophotographic method.

Figure 2:
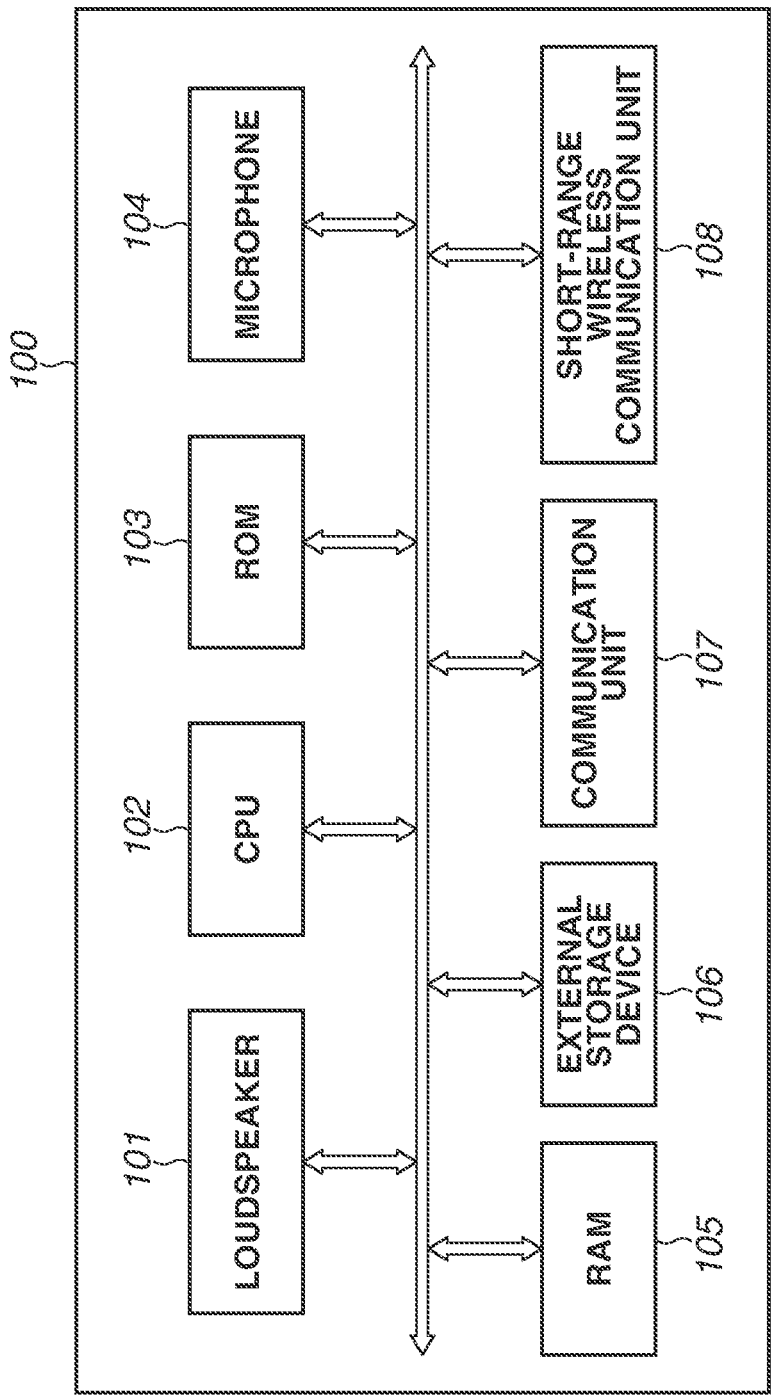
FIG. 2 is a block diagram illustrating a general configuration of a voice device.
Figure 3:
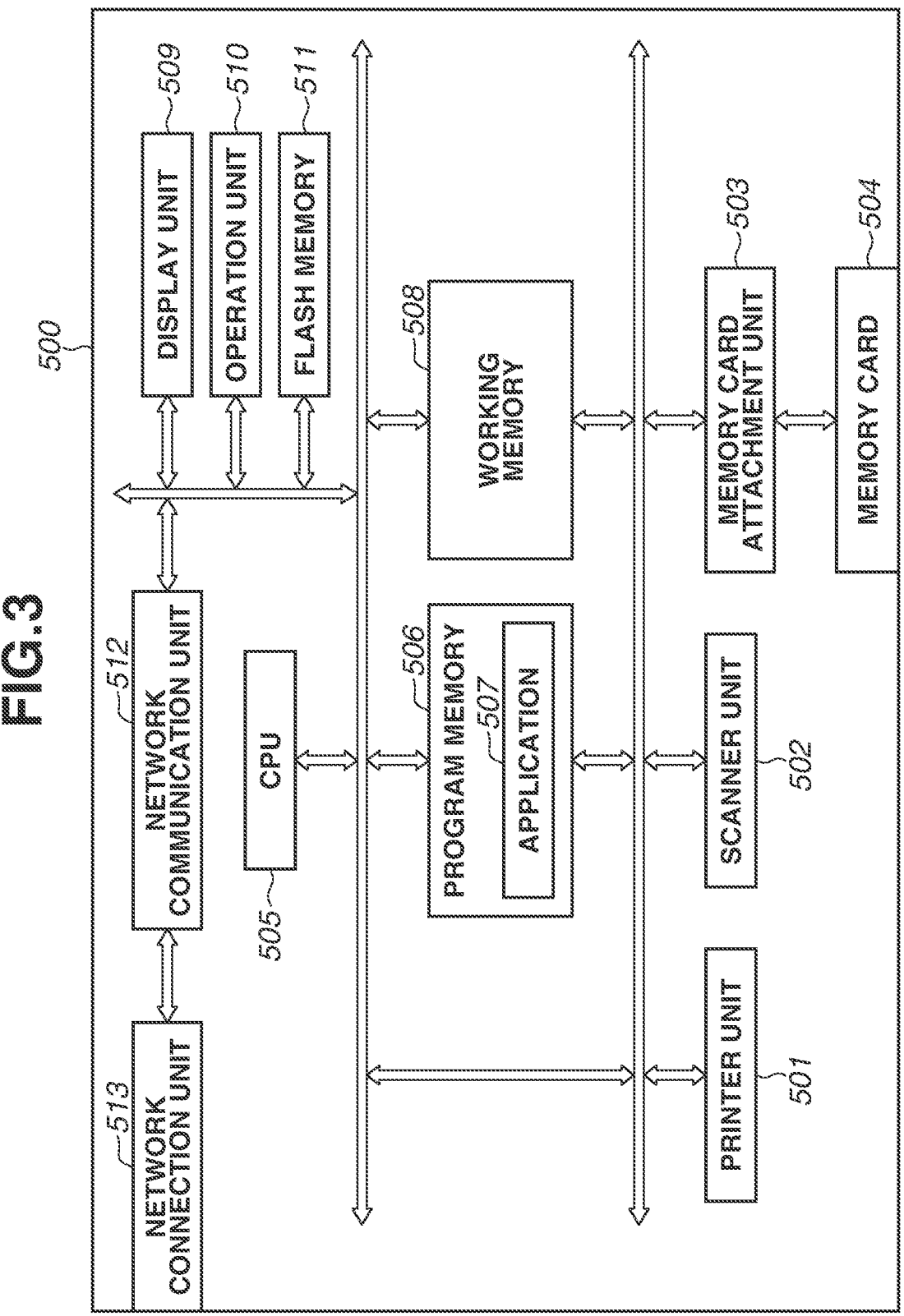
FIG. 3 is a block diagram illustrating a general configuration of a multifunction peripheral (MFP).
Figure 4:
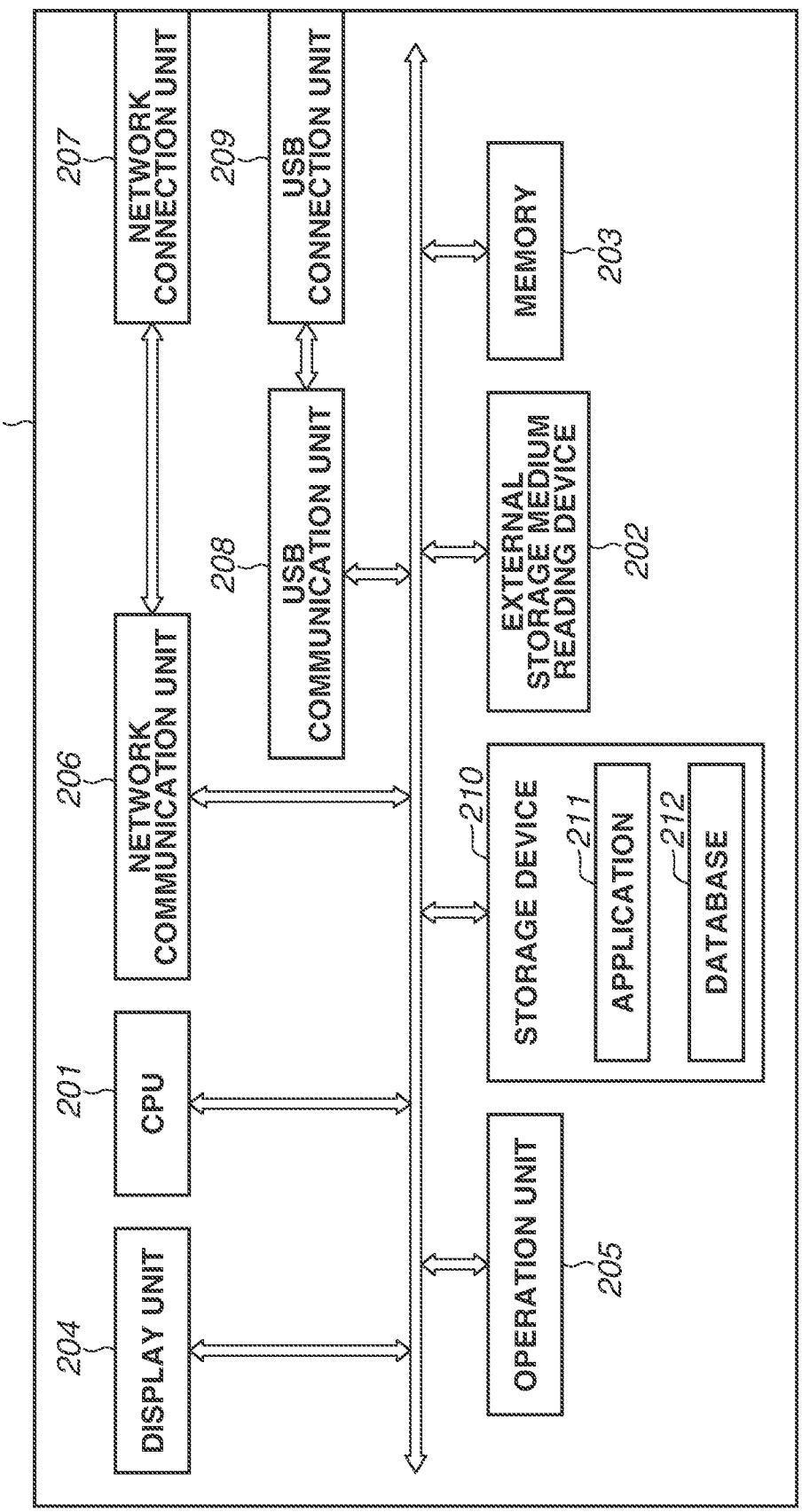
FIG. 4 is a block diagram illustrating a general configuration of a voice device/app management service and a print management service.

FIG. 2 is a hardware configuration diagram of the voice device 100. The voice device 100 includes a loudspeaker 101, a central processing unit (CPU) 102, a read-only memory (ROM) 103, a microphone 104, a random-access memory (RAM) 105, an external storage device 106, a communication unit 107, and a short-range wireless communication unit 108. Blocks illustrated in FIGS. 2 to 4 are connected to each other, for example, using an internal bus. These configurations are merely examples, and the apparatuses may include hardware other than that illustrated in FIGS. 2 to 4. Further, a plurality of blocks in FIGS. 2 to 4 may be grouped together as a single block, or a single block in FIGS. 2 to 4 may be divided into two or more blocks. That is, the apparatuses can have any configurations in the range where the apparatuses can execute processing as described below.

The loudspeaker 101 outputs a voice by processing described below. The CPU 102 is a control unit of a system and controls the entirety of the voice device 100. The ROM 103 stores fixed data such as control programs to be executed by the CPU 102, a data table, and an embedded operating system (OS) program. In the present exemplary embodiment, the control programs stored in the ROM 103 are used to control the execution of software such as scheduling, a task switch, and an interrupt process under control of the embedded OS stored in the ROM 103. The microphone 104 receives a voice around the voice device 100, such as the utterance of the user. The RAM 105 is composed of, for example, a static random-access memory (SRAM), which requires a backup power supply. The RAM 105 holds data using a primary battery for data backup (not illustrated) and therefore can store data such as a program control variable without volatilizing the data. The RAM 105 also stores a memory area for storing setting information regarding the voice device 100 and management data of the voice device 100. Further, the RAM 105 is also used as a main memory and a work memory for the CPU 102. The external storage device 106 stores application software. The communication unit 107 includes a circuit and an antenna for performing communication according to a predetermined wireless communication method such as Wi-Fi. Further, the communication unit 107 occasionally operates as a master station (e.g., an access point or a Wi-Fi Direct group owner) that is temporarily used. The communication unit 107 according to the present exemplary embodiment may have the ability to operate according to a wireless communication method using a wireless local area network (LAN) compliant with the Institute of Electrical and Electronics Engineers (IEEE) 802.11 standard series, or may have the ability to operate according to another wireless communication method. The short-range wireless communication unit 108 wirelessly communicates with another apparatus present in a certain short range from the voice device 100. The short-range wireless communication unit 108 performs communication according to a wireless communication method different from that of the communication unit 107. The communication speed of the short-range wireless communication unit 108 is slower than the communication speed of the communication unit 107. Further, the communication range of the short-range wireless communication unit 108 is smaller than the communication range of the communication unit 107. In the present exemplary embodiment, the short-range wireless communication unit 108 operates according to the Bluetooth (registered trademark) standard. For a setup process for the voice device 100, the communication unit 107 of the voice device 100 operates as a master station that is temporarily used.

For example, if the voice device 100 is turned on, the communication unit 107 operates as the master station that is temporarily used. Then, by operating a user terminal, the user of the voice device 100 wirelessly connects the user terminal of the user to a network created by the communication unit 107 temporarily operating as the master station. Specifically, by operating the user terminal, the user selects a Service Set Identifier (SSID) of the network created by the communication unit 107 temporarily operating as the master station, thereby establishing a wireless connection between the user terminal and the voice device 100.

Then, using a setting screen provided by an application installed on the user terminal and corresponding to the voice device 100, the user inputs an SSID and a password for connecting the voice device 100 to an infrastructure. The SSID and the password to be input at this time correspond to a network created by an external master station such as an external access point outside the voice device 100 and the user terminal.

The SSID and the password input to the setting screen are transmitted from the user terminal to the voice device 100 via the network created by the communication unit 107 temporarily operating as the master station. The voice device 100 executes a connection process using the received SSID and password, thereby constructing a system as in FIG. 1. In the present exemplary embodiment, the network generated by the communication unit 107 temporarily operating as the master station is used. Alternatively, the above setup process may be executed by wirelessly connecting the voice device 100 and the user terminal, for example, using the short-range wireless communication unit 108.

FIG. 3 is a block diagram illustrating the general configuration of the MFP 500 as an image processing apparatus. In the specification, a description is given exclusively using an MFP as an example of a peripheral apparatus. The peripheral apparatus, however, may be an image processing apparatus, a copying machine, a facsimile, or a single-function printing apparatus.

In the MFP 500, a print function is achieved by a printer unit 501, a scanner function is achieved by a scanner unit 502, and a storage function is achieved by a memory card attachment unit 503 and a memory card 504.

The printer unit 501 prints image data received from outside or image data stored in the memory card 504 on a print sheet by a recording method such as an inkjet method or an electrophotographic method. Furthermore, the printer unit 501 also manages ink information including the amount of remaining ink, and sheet information including the number of stacked sheets.

The scanner unit 502 optically reads a document set on a document platen (not illustrated), converts the read document into electronic data, and further converts the electronic data into a specified file format, thereby obtaining image data. Then, the scanner unit 502 transmits the image data to an external apparatus via a network or stores the image data in a storage area (not illustrated) of a hard disk drive (HDD). A copy service is achieved as follows. The scanner unit 502 reads a document placed on the document platen, thereby generating image data. The scanner unit 502 transfers the image data to the printer unit 501, and the printer unit 501 prints the image data on a print sheet.

The memory card 504 attached to the memory card attachment unit 503 stores various pieces of file data. These pieces of file data are occasionally read from an external apparatus via a network and edited. Further, the external apparatus can also store file data in the memory card 504.

Furthermore, the MFP 500 includes a CPU 505, a program memory 506, a working memory 508, a display unit 509, an operation unit 510, a network communication unit 512, a network connection unit 513, and a flash memory 511. The CPU 505 is a central arithmetic unit for controlling the components in the MFP 500. The program memory 506 is composed of a ROM and stores various program codes and an application 507 for communicating with a server apparatus. The application 507 accesses the printer unit 501 and acquires information regarding consumable products such as ink and sheets. The working memory 508 is composed of a RAM and temporarily stores or buffers image data when each service is executed. The display unit 509 is composed of, for example, a liquid crystal display (LCD) and displays various pieces of information. The operation unit 510 is composed of a switch for the user to perform various input operations.

The network communication unit 512 connects the MFP 500 to a network and performs various types of communication. Basically, the network communication unit 512 is similar to the communication unit 107. The network communication unit 512 can connect to a network such as the Internet via the network connection unit 513. The network communication unit 512 is compatible with a wired LAN and a wireless LAN. In a case where the network communication unit 512 is compatible with a wired LAN, the network connection unit 513 is a connector to which a wired LAN cable is connected. In a case where the network communication unit 512 is compatible with a wireless LAN, the network connection unit 513 is an antenna. In the present exemplary embodiment, in a case where the image processing apparatus performs wireless communication using a wireless LAN, the network communication unit 512 performs wireless communication compliant with the IEEE 802.11 standard series. Further, the network communication unit 512 may exclusively perform wired communication using a wired LAN and wireless communication using a wireless LAN, or may perform wired communication using a wired LAN and wireless communication using a wireless LAN in parallel. The network connection unit 513 may be compatible with both a wired LAN and a wireless LAN. The flash memory 511 is a non-volatile memory for storing image data received by the network communication unit 512. The processing of the MFP 500 described below is achieved by the CPU 505 reading and executing a program required for the processing. Further, although not illustrated in FIG. 3, the image processing apparatus may also perform short-range wireless communication according to the Bluetooth (registered trademark) standard. Further, this short-range wireless communication and the above wireless communication using a wireless LAN may be achieved by different chips, or may be achieved by the same chip.

FIG. 4 is a block diagram illustrating the general configuration of the server on which the voice device/app management service 200, the app 300, or the print management service 400 can operate.

A CPU 201 is a central arithmetic unit for controlling the following components. A storage device 210 stores an application program 211, a database 212, and an OS to be read by the CPU 201, and various files. An external storage medium reading device 202 is a device for reading information in a file stored in an external storage medium such as a Secure Digital (SD) card. A memory 203 is composed of a RAM, and the CPU 201 temporarily stores or buffers data in the memory 203, where necessary. The display unit 204 is composed of, for example, an LCD and displays various pieces of information. An operation unit 205 is composed of a keyboard and a mouse for the user to perform various input operations. A network communication unit 206 connects to a network such as the Internet via a network connection unit 207 and performs various types of communication. Basically, the network communication unit 206 is similar to the communication unit 107. The network communication unit 206 is compatible with a wired LAN and a wireless LAN. In a case where the network communication unit 206 is compatible with a wired LAN, the network connection unit 207 is a connector to which a wired LAN cable is connected. In a case where the network communication unit 206 is compatible with a wireless LAN, the network connection unit 207 is an antenna. In the present exemplary embodiment, in a case where the image processing apparatus performs wireless communication using a wireless LAN, the network communication unit 206 performs wireless communication compliant with the IEEE 802.11 standard series. Further, the network connection unit 207 may be compatible with both a wired LAN and a wireless LAN. A Universal Serial Bus (USB) communication unit 208 connects to various peripheral apparatuses via a USB connection unit 209 and performs various types of communication. The processing of the voice device/app management service 200, the app 300, or the print management service 400 described below is achieved by the CPU 201 reading and executing a program required for the processing.

Figure 5:
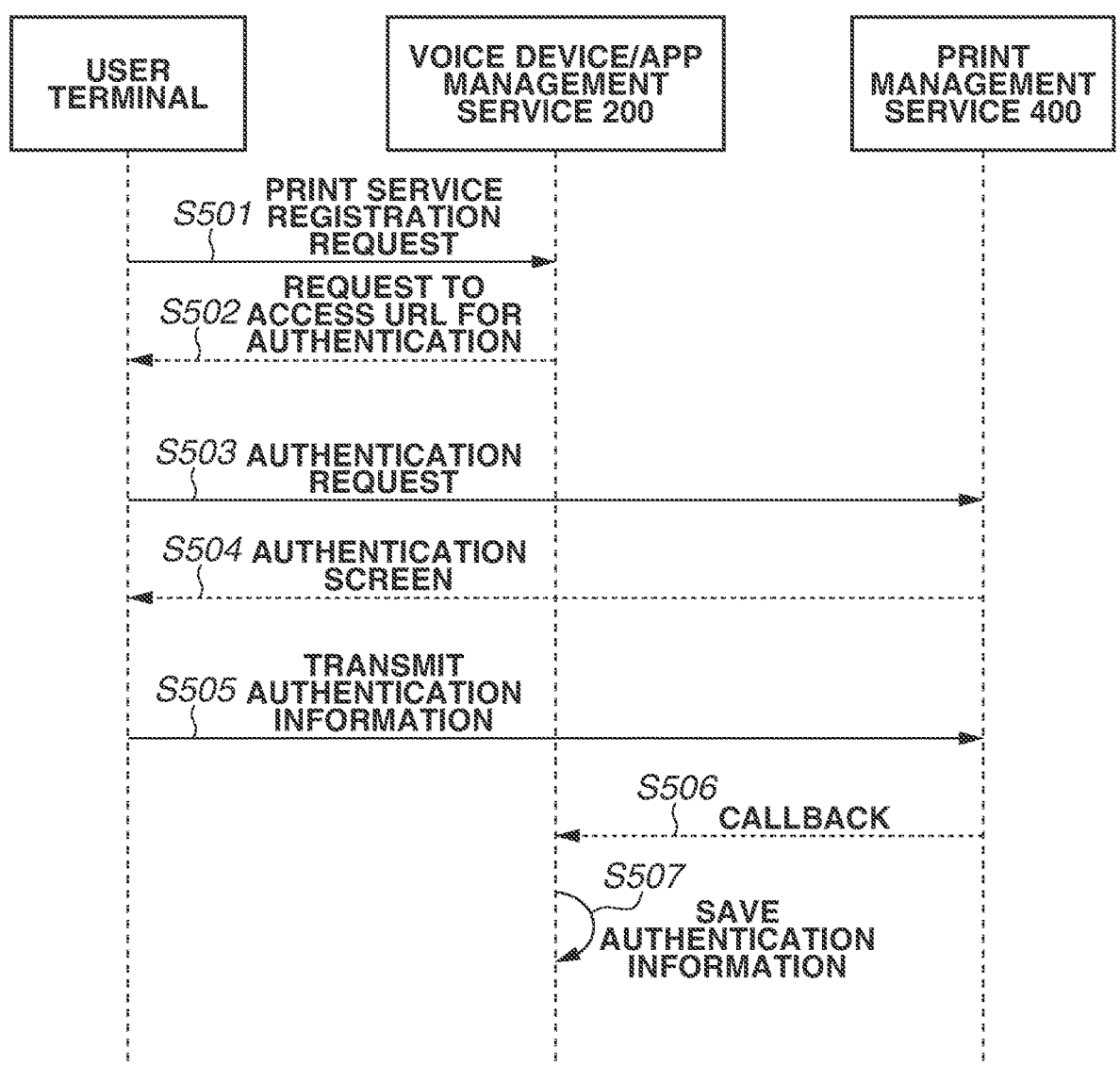
FIG. 5 is a sequence diagram for associating the voice device and the MFP.

FIG. 5 illustrates a sequence diagram for associating the voice device 100 and the MFP 500 to use services in the printing system illustrated in FIG. 1. The user uses a user terminal such as a mobile terminal or a personal computer associated with the voice device 100 in advance. That is, the user terminal can also communicate with the apparatuses illustrated in FIG. 1 via the Internet. In step S501, based on an instruction from the user, the user terminal transmits to the voice device/app management service 200 a request to register a print service. This registration request may be executed by, for example, a local application installed on the user terminal, or may be executed through a web page via a web browser.

If receiving the request to register the print service in the print management service 400, then in step S502, the voice device/app management service 200 transmits to the user terminal a request to access a Uniform Resource Locator (URL) for authenticating the print management service 400. Receiving the access request, then in step S503, the user terminal transmits an authentication request to the print management service 400 using the specified URL. In step S504, the user terminal receives an authentication screen from the print management service 400.

Using the authentication screen displayed in step S504, the user inputs authentication information required to use the print management service 400 and registered in advance. For example, a user identification (ID) and a password registered for the user to log into the print management service 400 correspond to the authentication information required to use the print management service 400. The user inputs the authentication information required to use the print management service 400 on the user terminal. In step S505, the user terminal transmits the authentication information to the print management service 400. Then, the print management service 400 executes an authentication process.

If the authentication process is normally completed, then in step S506, the print management service 400 transmits a callback to the voice device/app management service 200. Based on this callback, the voice device/app management service 200 can acquire authentication information for accessing the print management service 400. Using the authentication information acquired at this time, the voice device/app management service 200 can access the print management service 400. For example, if the user of the user terminal gives an utterance regarding the use of the print service to the voice device 100 associated with the user terminal, a request corresponding to the utterance is transmitted to the print management service 400 via the voice device/app management service 200. At this time, the authentication information acquired in step S506 is used. Further, the print management service 400 identifies the logged-in user based on an access token and thereby can identify the MFP 500 registered by the user.

In step S507, the voice device/app management service 200 saves the authentication information, such as an access token and a refresh token, required to access the print management service 400 together with information regarding the voice device 100 associated with the user terminal.

In the present exemplary embodiment, the method for associating the voice device 100 and the MFP 500 is described based on a user authentication process termed OAuth. Alternatively, another method may be used so long as the method can associate the voice device 100 and the MFP 500.

Figure 6:
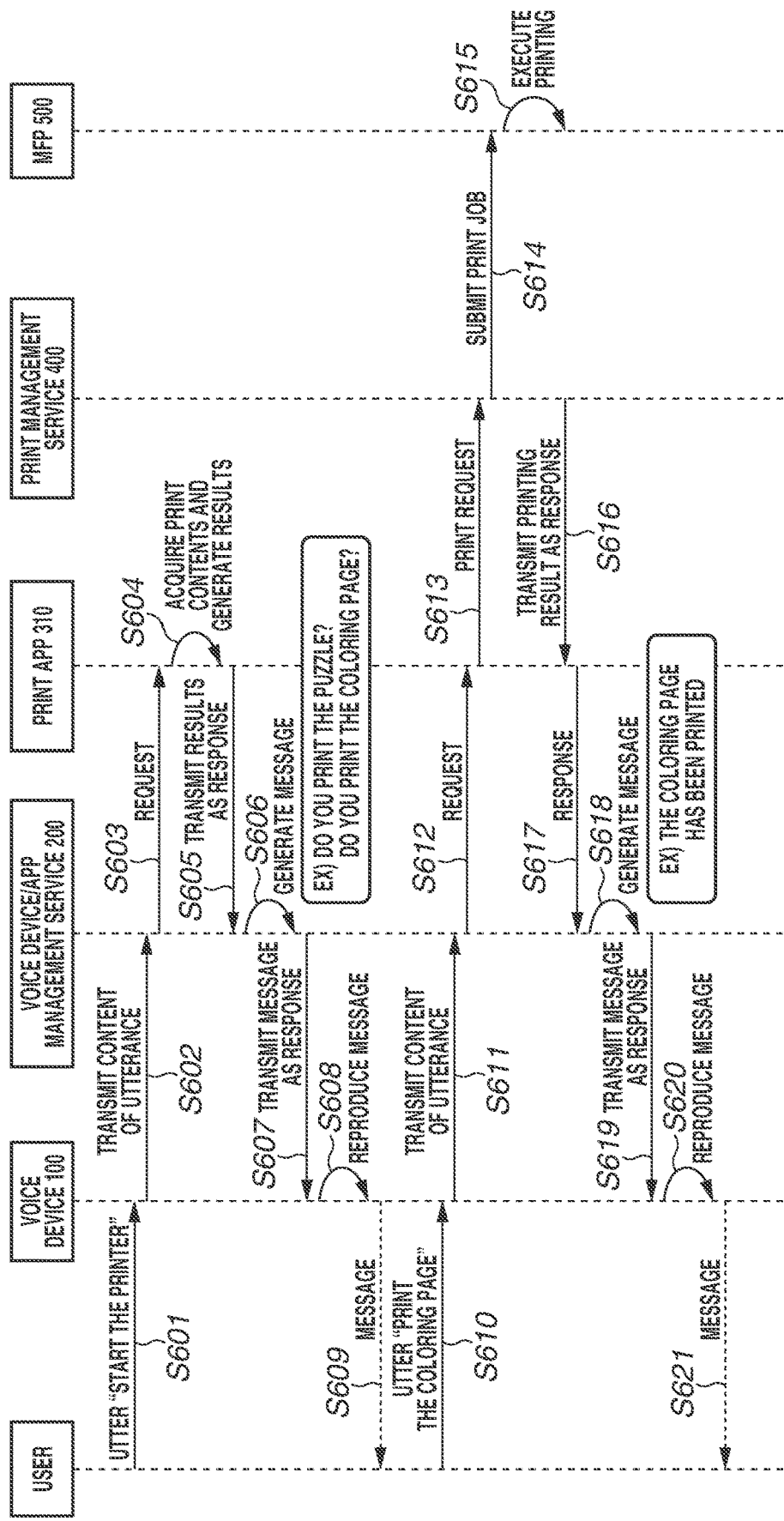
FIG. 6 is a sequence diagram illustrating a printing process based on a voice instruction.

Next, with reference to FIG. 6, a description is given of the flow until the voice device 100 causes the MFP 500 to execute a printing process via a print app 310 having a print function. The print app 310 is an example of the app 300 illustrated in FIG. 1. Although described below with reference to FIG. 6, the print app 310 reads a print content. Thus, the storage device 210 of the server on which the print app 310 operates saves content data (e.g., content data of a coloring page). In the present exemplary embodiment, the app 300 is occasionally referred to as a "service". Thus, the print app 310 is occasionally referred to as the "print service 310".

In step S601, the user utters "Start the printer" to the voice device 100. In step S602, the voice device 100 transmits utterance data corresponding to the content of the received utterance to the voice device/app management service 200. The utterance data may be voice data indicating the content of the utterance, or may be text data generated from the content of the utterance.

Based on the utterance data received from the voice device 100, the voice device/app management service 200 determines a target app. In the voice device/app management service 200, a plurality of applications is registered for the user using the voice device 100. The plurality of applications is registered using the above application corresponding to the voice device 100. At this time, based on a keyword included in the utterance data, the voice device/app management service 200 determines the target app to be used. In the present exemplary embodiment, the keyword "Start the printer" is registered as a keyword for starting the print app 310. Thus, if the keyword "Start the printer" is included in the utterance data, the voice device/app management service 200 determines the print app 310 as the target app. After that, the utterance of the user to the voice device 100 serves as a request to the print app 310 until the sequence in FIG. 6 is completed.

In step S603, the voice device/app management service 200 requests from the print app 310 a list of contents that can be printed. Receiving the request, then in step S604, the print app 310 generates a list of contents that can be printed. In step S605, the print app 310 returns the list of contents to the voice device/app management service 200. The list of contents created at this time may be held within the print app 310, or may be dynamically generated based on attribute information regarding the user. Receiving the response from the print app 310, then in step S606, the voice device/app management service 200 generates a message to be output as a voice through the voice device 100. It is desirable that the content of the message generated at this time should be a content urging the user to perform the next action. Possible examples of the content of the message include an inquiry presenting options for contents that can be printed and allowing the user to select one of the options, and a message limiting the next utterance of the user, such as "Yes/No". In step S607, the voice device/app management service 200 transmits utterance data corresponding to the generated message to the voice device 100. In step S608, the voice device 100 reproduces the utterance data using the loudspeaker 101. Consequently, in step S609, the message is delivered to the user. For example, examples of the contents provided by the print app 310 include a coloring page content, a game content, and a five-line staff content. However, at least one of these contents may be provided, or another content may be provided.

Hearing the message, then in step S610, the user utters to the voice device 100 a content that the user wishes to print. For example, if the user utters "Print the coloring page", then in step S611, the voice device 100 transmits utterance data of the user to the voice device/app management service 200. Then, in step S612, the voice device/app management service 200 requests the print app 310 to print the content selected by the user. The request in step S612 includes the authentication information saved in step S507.

Receiving the request, the print app 310 transmits a request to identify a printing apparatus of the user, together with the authentication information to the print management service 400, and acquires a printer ID indicating the MFP 500 for the user. Further, based on the type of the print content included in the request received in step S612, the print app 310 reads a print content (a print content of a coloring page in the example of FIG. 6) and transmits an upload request to the print management service 400. By this upload request, the print management service 400 notifies the print app 310 of a job ID and an upload URL. The print app 310 saves the read print content at the specified upload URL. Further, the print app 310 identifies print setting information to be used to print the print content. Then, in step S613, the print app 310 transmits a print request including the authentication information, the printer ID, the job ID, and the identified print setting information to the print management service 400. The print setting information includes setting values such as the sheet size "A4", the sheet type "plain paper", color/monochrome "color", and two-sided/one-sided printing "one-sided".

The print management service 400 identifies the MFP 500 of the user corresponding to the printer ID transmitted in step S613. Next, based on the print content acquired from the upload URL corresponding to the job ID transmitted in step S613 and the print setting information transmitted in step S613, the print management service 400 generates a print job. Then, in step S614, the print management service 400 transmits the print job to the identified MFP 500. If the print job is appropriately transmitted, then in step S616, the print management service 400 transmits a response indicating the success of printing to the print app 310. If the print job is not appropriately transmitted, then in step S616, the print management service 400 transmits a response indicating the failure of printing to the print app 310. In the present exemplary embodiment, a case has been described where the transmission result of the print job is transmitted as a printing result in step S616. Alternatively, the result of a printing process by the MFP 500 may be transmitted as a printing result in step S616. Receiving the print job, then in step S615, the MFP 500 executes printing based on the print job.

In step S617, the print app 310 generates information including a message to be uttered to the user and transmits the information to the voice device/app management service 200. In step S618, based on the information received in step S617, the voice device/app management service 200 generates a message to be output as a voice through the voice device 100. In step S619, the voice device/app management service 200 transmits utterance data corresponding to the generated message to the voice device 100. In step S620, the voice device 100 reproduces the utterance data using the loudspeaker 101. Consequently, in step S621, the message is delivered to the user.

FIG. 6 illustrates the printing flow in which the print app 310 having a print function is used alone according to a voice instruction received by the voice device 100, and the MFP 500 is caused to execute a printing process. Next, with reference to FIG. 7, a description is given of the flow in which a plurality of apps is cooperatively used according to a voice instruction received by the voice device 100, and the MFP 500 is caused to execute a printing process. In this case, a search app (search service) 320 having a search function is used as an example of an app that cooperates with the print app 310. The app, however, can be of any type such as a fortune telling app, a weather forecast app, or a recipe app so long as the app can supply a print content to the print app 310. As will be described below, each of these apps generates a print content and therefore is occasionally referred to as a "print content generation app (or print content generation service)". That is, in the example of FIG. 7, as the app 300, the print app 310 and the search app 320, which is a print content generation app, are present.

First, in step S701, the user utters "Start the search app" to the voice device 100. In step S702, the voice device 100 transmits utterance data corresponding to the content of the received utterance to the voice device/app management service 200. The utterance data to be transmitted at this time includes the keyword "Start the search app". Based on the received utterance data, the voice device/app management service 200 determines a target app. In the present exemplary embodiment, the keyword "Start the search app" is registered as a keyword for starting the search app 320. Thus, if the keyword "Start the search app" is included in the utterance data, the voice device/app management service 200 determines the search app 320 as the target app.

In step S703, the voice device/app management service 200 transmits a start request to the search app 320. In step S704, the search app 320 generates text data including a message inquiring of the user about a search keyword. In step S705, the search app 320 transmits the text data as a response to the voice device/app management service 200.

The text data to be generated in step S704 includes, for example, the message "What do you check?".

In step S706, based on the response from the search app 320, the voice device/app management service 200 generates a message to be uttered to the user. In step S707, the voice device/app management service 200 transmits utterance data corresponding to the generated message to the voice device 100. In step S708, the voice device 100 reproduces the received utterance data using the loudspeaker 101. Consequently, in step S709, the message is delivered to the user.

In step S710, the user utters, for example, "Tell me about ○○" regarding things that the user wishes to check. Then, in step S711, the voice device 100 transmits utterance data to the voice device/app management service 200. In step S712, the voice device/app management service 200 transmits to the search app 320 a search keyword included in the utterance data received from the voice device 100. The search app 320 transmits the received keyword to, for example, a search application programming interface (API) on the Internet and acquires the result of searching for the keyword. Then, in step S713, based on the search result, the search app 320 generates a print content. As an example of the data format of the print content, Portable Document Format (PDF) is used. Next, in step S714, the search app 320 returns a response including additional information for requesting an app having a print function (hereinafter referred to as "subsequent app information") and the print content to the voice device/app management service 200. The print content generated at this time only needs to be able to be referenced by the print app 310. Thus, the print content itself may be returned to the voice device/app management service 200, or the print content may be temporarily uploaded to a file server, and reference information regarding (the URL of) the print content may be returned to the voice device/app management service 200.

If subsequent app information is included as additional information in the response information, the voice device/app management service 200 searches a list of apps managed by the voice device/app management service 200 and registered by the user for an app having a print function. If an app having a print function (the print app 310) is present, then in step S715, the voice device/app management service 200 generates a message urging the user to determine whether to continue a printing process for printing the search result using the app having a print function. Examples of the message to be generated in step S715 include "Do you print the search result using the print app 310?". In step S716, the voice device/app management service 200 transmits utterance data corresponding to the generated message to the voice device 100. In step S717, the voice device 100 reproduces the utterance data using the loudspeaker 101. Consequently, in step S718, the message is delivered to the user. In the list of apps managed by the voice device/app management service 200 and registered by the user, a plurality of print apps having a print function may be registered. That is, a plurality of print apps capable of executing a printing process based on a print content generated by a print content generation app may be registered. In this case, a plurality of print apps having a print function is searched for in step S715. Thus, the voice device/app management service 200 may generate a message for allowing the user to select which of the plurality of print apps is to be used. As the plurality of print apps, two print apps may be registered, or three or more print apps may be registered. Based on this message, the voice device 100 gives an utterance related to an inquiry about which of the plurality of apps having a function related to printing and found by the search is to be used. Then, if the voice device/app management service 200 receives an answer to this message, the process of step S715 is resumed. Further, an app having high priority among the plurality of print apps having a print function may be automatically selected. A "print app having a print function" is an app having the function of issuing an instruction for causing a printing apparatus to print a print content generated by a print content generation app (the search app 320 in the present exemplary embodiment) in such a manner that the print app 310 executes printing in the following processing.

Further, a printing apparatus as a control target differs with respect to each print app. To avoid such a situation, a print app that can be registered in the voice device/app management service 200 by the user may be limited to a single print app.

At this time, if an app having a print function is not registered in the voice device/app management service 200 by the user, the voice device/app management service 200 may search for an app having a print function managed by the voice device/app management service 200 and not registered by the user and recommend an app found by the search to the user.

In step S719, if the user makes a reply such as "Print it" or "Yes", the utterance of the user is input to the voice device 100. In step S720, similarly to the above, the voice device 100 transmits utterance data to the voice device/app management service 200.

In step S721, the voice device/app management service 200 starts the print app 310 having a print function and transmits to the print app 310 a request including the print content received from the search app 320. The request to be transmitted in step S721 also includes the additional information added in step S713.

The print app 310 transmits a request to identify a printing apparatus of the user, together with the authentication information to the print management service 400, and acquires a printer ID indicating the MFP 500 for the user. Further, if receiving the print content included in the request, the print app 310 transmits an upload request to the print management service 400. By this upload request, the print management service 400 notifies the print app 310 of a job ID and an upload URL. The print app 310 saves the read print content at the specified upload URL. Further, the print app 310 identifies print setting information to be used to print the print content. The print setting information includes setting values such as the sheet size "A4", the sheet type "plain paper", color/monochrome "color", and two-sided/one-sided printing "one-sided". Then, in step S722, the print app 310 transmits a print request including the authentication information, the printer ID, the job ID, and the identified print setting information to the print management service 400. If the request received in step S721 includes reference information for referencing the print content (information other than the substance of a file, such as the URL), the print app 310 acquires the print content based on the reference information and then transmits the upload request.

The processes of steps S723 to S725 are basically similar to those of steps S614 to S616, and therefore are not described in detail. In step S726, the print app 310 transmits information including the printing result as a response to the voice device/app management service 200. The voice device/app management service 200 transmits to the search app 320 the response from the print app 310, and the search app 320 continues the subsequent processing based on the response. By the above processing, the result of the search executed by receiving the inquiry in step S710 is output as a print product from the MFP 500. If a weather forecast app is started by the utterance of the user in step S701, then based on a print content generated by the weather forecast app, a today's weather forecast or a weekly weather forecast is output as a print product. Further, if a news app is started by the utterance of the user in step S701, then based on a print content generated by the news app, a news is output as a print product.

Figure 9:
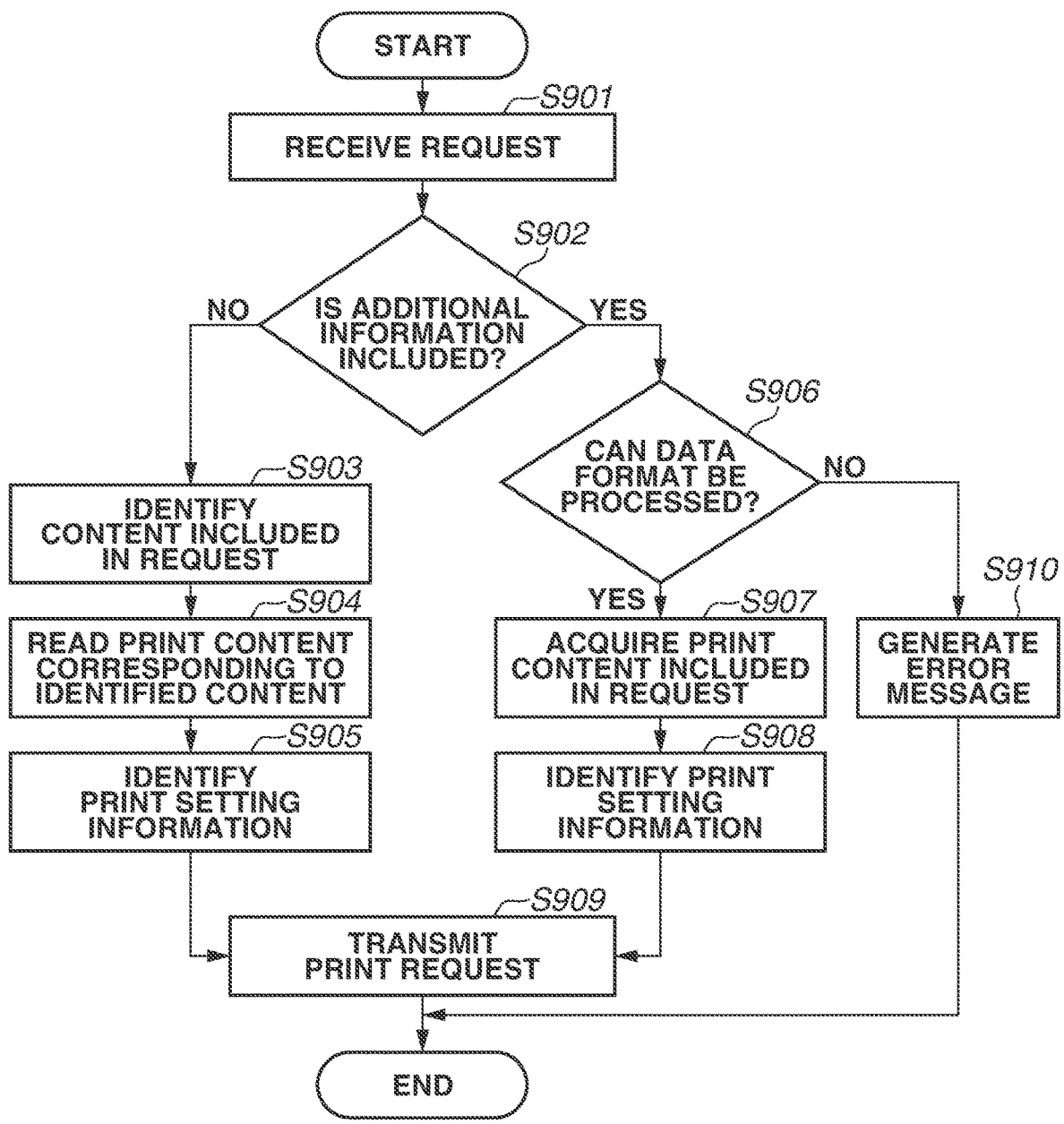
FIG. 9 is a flowchart to be executed by a print app.

With reference to FIG. 9, the processing flow of the print app 310 is described. Steps in FIG. 9 are achieved by the CPU 201 of the server on which the print app 310 operates reading and executing a program related to the flowchart. Processes in the flowchart in FIG. 9 are started by receiving the request in step S612 in FIG. 6 or the request in step S721 in FIG. 7.

In step S901, the CPU 201 receives a request from the voice device/app management service 200. Step S901 corresponds to the process of step S612 or S721.

In step S902, the CPU 201 determines whether predetermined additional information is included in the received request. The predetermined additional information is added by another app (the search app 320 in the present exemplary embodiment) different from the print app 310 in steps S713 and S714.

If it is determined that the additional information is not included (No in step S902), the CPU 201 executes steps S903 to S905. If it is determined that the additional information is included (Yes in step S902), the CPU 201 executes steps S906 to S908. Steps S903 to S905 correspond to step S613 in FIG. 6. Steps S906 to S908 correspond to step S722 in FIG. 7.

In step S903, the CPU 201 identifies a content included in the received request. In the present exemplary embodiment, information indicating a "coloring page" is included. Thus, the CPU 201 identifies a "coloring page", and in step S904, the CPU 201 reads a print content corresponding to the "coloring page" from the storage device 210.

Then, in step S905, the CPU 201 identifies print setting information for printing the print content of the "coloring page".

In step S909, the CPU 201 transmits a print request including the print setting information identified in step S905.

If, on the other hand, it is determined that the additional information is included (Yes in step S902), then in step S906, based on the information included in the received request, the CPU 201 determines whether the data format of a print content is a data format that can be processed. If it is determined that the data format of the print content is the format of data that can be processed (Yes in step S906), then in step S907, the CPU 201 acquires the print content. In the present exemplary embodiment, a print content in the PDF format generated by the search app 320 is acquired. As described above, if a URL indicating the save location of the print content is included in the request received in step S901, the CPU 201 acquires the print content via the Internet using the URL.

Then, in step S908, the CPU 201 identifies print setting information for printing the print content acquired in step S907. The print setting information identified in step S908 may include the same setting values as, or different setting values from, those of the print setting information identified in step S905. Further, in step S907, the CPU 201 may identify the print setting information itself identified in step S905. Further, in step S908, no matter what application the print content generation app as a cooperation target is, the CPU 201 may identify the same print setting information. For example, a situation is possible where the search app 320 that generates a print content of a search result and a weather forecast app that generates a print content of a weather forecast are registered in the voice device/app management service 200. In this situation, whether the app started in step S701 is the search app 320 or the weather forecast app, the same print setting information may be identified in step S908. Conversely, the CPU 201 may identify different print setting information depending on the print content generation app as a cooperation target. That is, if the search app 320 generates a print content, print setting information corresponding to the search app 320 may be identified. If, on the other hand, the weather forecast app generates a print content, another piece of print setting information corresponding to the weather forecast app (i.e., print setting information different from the print setting information corresponding to the search app 320) may be identified. For example, the print content of the search app 320 may be printed in monochrome, while the print content of the weather forecast app may be printed in color.

In step S909, the CPU 201 transmits a print request including the print setting information identified in step S908.

Figure 7:
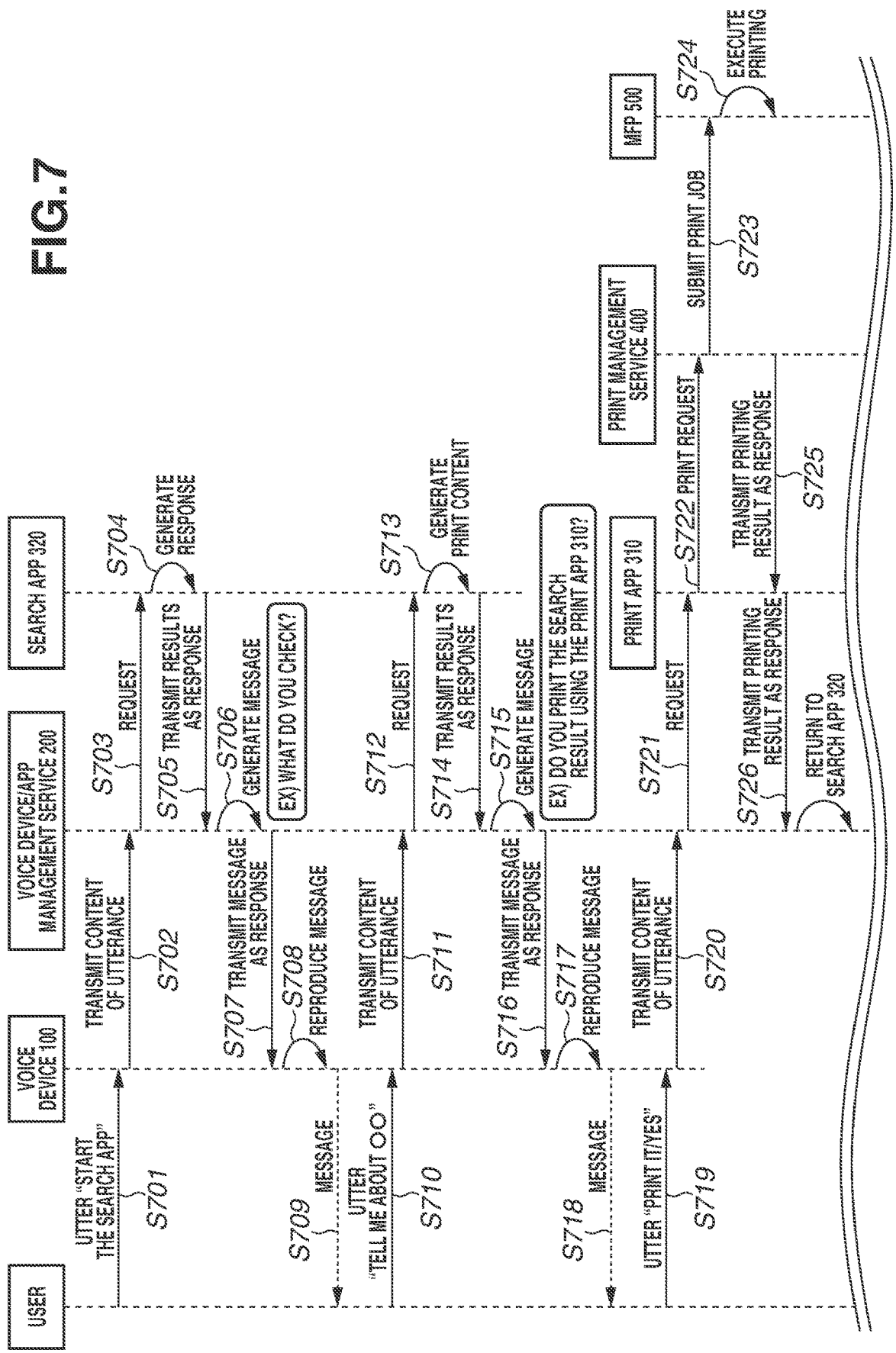
FIG. 7 is a sequence diagram illustrating a printing process based on a voice instruction.

Further, although not illustrated in FIG. 7, if it is determined in step S906 that the data format of the print content is not the format of data that can be processed (No in step S906), then in step S910, the CPU 201 generates an error message. Then, the CPU 201 transmits the generated error message to the voice device/app management service 200. By this processing, the voice device 100 notifies the user, by a voice, of a message indicating that the print content cannot be printed.

As described above, the print app 310 according to the present exemplary embodiment can cause the MFP 500 to execute a printing process based on a print content generated by another app. In this case, the printing process is executed by a voice instruction. Thus, it is possible to reduce the operation burden on the user related to printing. Further, the print app 310 automatically identifies print setting information. Thus, it is possible to further reduce the operation burden on the user.

In a second exemplary embodiment, an example is described where as a method for identifying print setting information in the print app 310, processing different from that in the first exemplary embodiment is executed, thereby providing a more convenient printing process to the user.

In the first exemplary embodiment, a description has been given using PDF as an example of the file format of a print content. As another example of the format of a print content, a document file (DOCX or comma-separated values (CSV)) or an image file (Joint Photographic Experts Group (JPEG) or Portable Network Graphics (PNG)) is also possible. The print app 310 distinguishes the file format of a print content received from an app at the previous stage (e.g., the search app 320). Then, for example, if the file format of the print content is distinguished as a document file, the print app 310 may identify print setting information for a document file (e.g., print setting information including A4 as the sheet size). Further, if the file format of the print content is distinguished as an image file, the print app 310 may identify print setting information for an image file (e.g., print setting information including an L-size as the sheet size).

Figure 8:
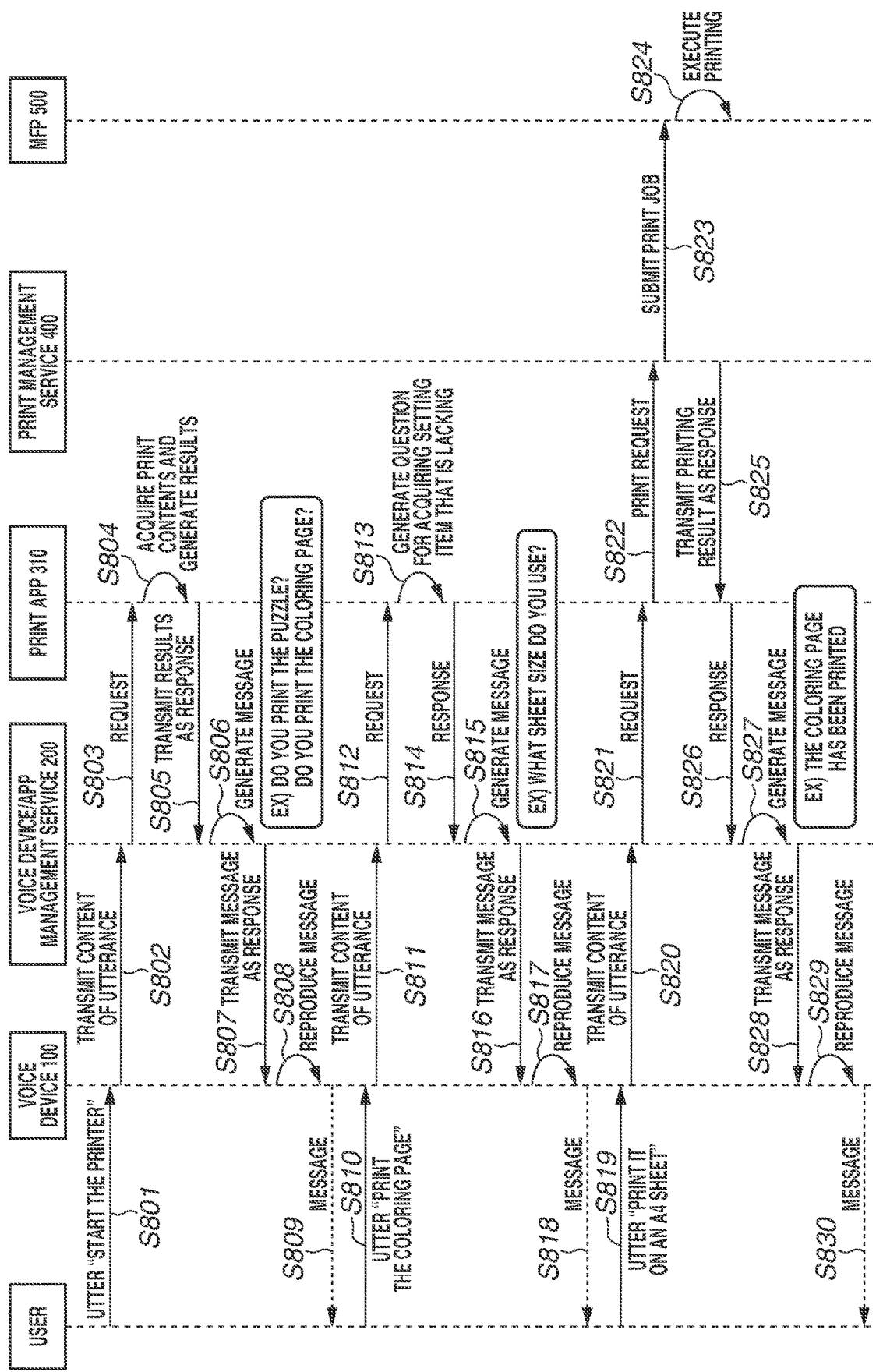
FIG. 8 is a sequence diagram including a process of determining a setting value necessary for printing.

Further, a case is also possible where the user wishes to print even an image file on an A4-size sheet. Thus, before requesting the print management service 400 to perform printing (before step S722), the print app 310 may generate a message inquiring about a sheet to be used for printing, and cause the voice device 100 to utter the message. With reference to FIG. 8, an example of a dialogue with the user is described. However, the flow until the previous stage where the print app 310 is started and a printing request is transmitted (steps S801 to S812) is similar to that in FIG. 6, and therefore is not described here.

When the print app 310 receives the request from the voice device/app management service 200, and if a setting value for printing is lacking, then in step S813, the print app 310 generates text data for acquiring the setting value that is lacking. Then, in step S814, the print app 310 transmits the text data as a response to the voice device/app management service 200. Receiving the response from the print app 310, then in step S815, the voice device/app management service 200 generates, for example, the message "What sheet size do you use?" from the text data. In step S816, the voice device/app management service 200 transmits utterance data corresponding to the generated message to the voice device 100. In steps S817, the voice device 100 reproduces the utterance data using the loudspeaker 101. Consequently, in step S818, the message is delivered to the user.

Hearing the message, then in step S819, the user replies to the voice device 100. For example, if the user utters "Print it on an A4 sheet", then in step S820, the voice device 100 transmits utterance data of the user to the voice device/app management service 200.

In step S821, the voice device/app management service 200 requests the print app 310 to print the content in the sheet size requested by the user. Receiving the request, then in step S822, the print app 310 identifies print setting information including the setting value specified when the print setting information is identified (print setting information including the A4 size in FIG. 8) and transmits a print request. The process of step S822 is basically similar to that in a case where the request in step S612 in FIG. 6 or step S721 in FIG. 7 is received.

At this time, if a setting value is still lacking, the processes of steps S813 to S821 may be repeated. The processing from when all necessary setting values are obtained and a print job is submitted to when a printing result is delivered to the user in steps S823 to S830 is similar to that in FIG. 6. The processing is also applicable to the processing in FIG. 7 in which another app and the print app 310 cooperate with each other.

The size of a sheet used for printing differs depending on the country or the region where the sheet is sold. For example, in some country or region, a letter sheet is used as an A4 sheet used to print a document file, and a KG sheet is used as an L-sized sheet used to print an image file.

In response, the print app 310 or the print management service 400 determines information regarding the country or the region where the MFP 500 is installed, thereby automatically distinguishing the type of a sheet. By this processing, the user can perform desired printing without being conscious of the size of a sheet that depends on the country or the region. In this case, the method for determining information regarding the country where the MFP 500 is installed does not matter so long as the method can identify the country or the region. The country or the region may be estimated based on, for example, a global Internet Protocol (IP) address of a network to which the MFP 500 is connected. Alternatively, the user may be caused to set their country of residence as a setting value of the MFP 500, and the determination may be executed based on the setting value.

As a setting value for printing, there are many setting values other than the type of a sheet, such as the light and shade of printing and the presence or absence of a margin. Although not mentioned in the first exemplary embodiment, if the user is allowed to specify setting values to be used for printing, printing more suitable to the user's taste can be performed. These setting values may be set when the user registers the print app 310 in the voice device/app management service 200, or may be set by repeating the processes of steps S813 to S821 in FIG. 8 before printing is executed by a voice.

To determine setting values necessary for printing, as described above, it is necessary to repeat a dialogue with the user and collect the setting values. If, however, the number of dialogues increases, detailed settings can be made, while the burden on the user increases. In response, setting values that are not changed much except in special cases, such as the number of copies to be printed, can be set as default values. Then, only a setting item specified by the user during a dialogue is also allowed to be overwritten. For example, if a request is not received from the user, a single copy is set. If an instruction to print two copies is given in another dialogue, the number of copies is changed to two copies. By the above processing, the user does not need to specify the number of copies in a case where the user wishes to print a single copy. Thus, it is possible to perform printing by satisfying the user's demand, while reducing the burden on the user.

Other Exemplary Embodiments

In the above exemplary embodiments, only the print management service 400 submits a print job to the MFP 500. The MFP 500, however, can also operate to receive print jobs from a plurality of print management services. In this case, authentication information regarding each of the plurality of print management services is held in the voice device/app management service 200.

Further, the present invention can be achieved also by performing the following process. This is the process of supplying software (a program) for achieving the functions of the above exemplary embodiments to a system or an apparatus via a network or various recording media, and of causing a computer (a CPU, a microprocessor unit (MPU), or a processor) of the system or the apparatus to read and execute the program. Further, the program may be executed by a single computer, or may be executed by the cooperation of a plurality of computers. Further, not all the above processing needs to be achieved by software, and part or all of the processing may be achieved by hardware such as an application-specific integrated circuit (ASIC). Further, the CPU may be not only a single CPU that performs all of the processing, but also a plurality of CPUs that appropriately cooperates to perform the processing.

According to the present invention, it is possible to reduce the operation burden on a user related to printing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments.

What is claimed is:

1. A print control system, comprising:
a voice device;
a printing apparatus; and
a print management server system configured to communicate with a voice device management server system;
the voice device including
a receiving unit configured to receive an utterance for printing print content of a first print content generation service or a second print content generation service;
the print management server system including
an identifying unit configured to identify print setting information for first content acquired from the first print content generation service in a case where the voice device receives an utterance for giving an instruction for printing as a response to an audio output regarding the first print content generation service output from the voice device in a state where an utterance for using the print management server system is not received in the voice device, and configured to identify print setting information for second content acquired from the second print content generation service in a case where the voice device receives an utterance for giving an instruction for printing as a response to an audio output regarding the second print content generation service output from the voice device in a state where an utterance for using the print management server system is not received in the voice device, wherein the print setting information identified for the first content and the print setting information identified for the second content are same as each other;
wherein
the printing apparatus includes
a print control unit configured to execute a printing process for a print job corresponding to the print content and the print setting information.

2. The print control system according to claim 1, wherein in a case where the voice device receives an utterance corresponding to an instruction to print a print content provided by a print service of the print management server system, the identifying unit is configured to identify print setting information for executing a printing process based on the print content provided by the print service, wherein the print setting information identified for the first content, the print setting information identified for the second content, and the print setting information identified to execute the printing process based on the print content provided by the print service are same as one another.

3. The print control system according to claim 1, wherein in a case where the voice device receives an utterance corresponding to an instruction to print a print content provided by a print service of the print management server system, the identifying unit is configured to identify print setting information for executing a printing process based on the print content provided by the print service, wherein the print setting information identified for the first content and the print setting information identified to execute the printing process based on the print content provided by the print service are different from each other.

4. The print control system according to claim 1, wherein the print content provided by the print service is at least one of a coloring page content, a game content, or a five-line staff content.

5. The print control system according to claim 1, further comprising: an acquisition unit configured to acquire the first print content by using Uniform Resource Locator (URL) of the first print content and acquire the second print content by using Uniform Resource Locator (URL) of the second print content.

6. The print control system according to claim 1, wherein the voice device management server system comprises one or more servers and the print management server system comprises one or more servers.

7. A print control system, comprising:
a printing apparatus; and
a print management server system configured to communicate with a voice device management server system;
the print management server system including
an identifying unit configured to identify print setting information for first content acquired from the first print content generation service in a case where a voice device receives an utterance for giving an instruction for printing as a response to an audio output regarding the first print content generation service output from the voice device in a state where an utterance for using the print management server system is not received in the voice device, and configured to identify print setting information for second content acquired from the second print content generation service in a case where the voice device receives an utterance for giving an instruction for printing as a response to an audio output regarding the second print content generation service output from the voice device in a state where an utterance for using the print management server system is not received in the voice device, wherein the print setting information identified for the first content and the print setting information identified for the second content are same as each other;
wherein
the printing apparatus includes
a print control unit configured to execute a printing process for a print job corresponding to the print content and the print setting information.

8. The print control system according to claim 7, wherein in a case where the voice device receives an utterance corresponding to an instruction to print a print content provided by a print service of the print management server system, the identifying unit is configured to identify print setting information for executing a printing process based on the print content provided by the print service, wherein the print setting information identified for the first content, the print setting information identified for the second content, and the print setting information identified to execute the printing process based on the print content provided by the print service are same as one another.

9. The print control system according to claim 7, wherein in a case where the voice device receives an utterance corresponding to an instruction to print a print content provided by a print service of the print management server system, the identifying unit is configured to identify print setting information for executing a printing process based on the print content provided by the print service, wherein the print setting information identified for the first content and the print setting information identified to execute the printing process based on the print content provided by the print service are different from each other.

10. The print control system according to claim 7, wherein the print content provided by the print service is at least one of a coloring page content, a game content, or a five-line staff content.

11. The print control system according to claim 7, further comprising: an acquisition unit configured to acquire the first print content by using Uniform Resource Locator (URL) of the first print content and acquire the second print content by using Uniform Resource Locator (URL) of the second print content.

12. The print control system according to claim 7, wherein the voice device management server system comprises one or more servers and the print management server system comprises one or more servers.

13. A print control system, comprising:
a voice device;
a printing apparatus; and
a print management server system configured to communicate with a voice device management server system;
the voice device including
a receiving unit configured to receive an utterance for printing print content of a first print content generation service or a second print content generation service;
the print management server system including
an identifying unit configured to identify print setting information for first content acquired from the first print content generation service in a case where the voice device receives an utterance for giving an instruction for printing as a response to an audio output regarding the first print content generation service output from the voice device in a state where an utterance for using the print management server system is not received in the voice device, and configured to identify print setting information for second content acquired from the second print content generation service in a case where the voice device receives an utterance for giving an instruction for printing as a response to an audio output regarding the second print content generation service output from the voice device in a state where an utterance for using the print management server system is not received in the voice device, wherein the print setting information identified for the first content and the print setting information identified for the second content are different from each other;

wherein the printing apparatus includes a print control unit configured to execute a printing process for a print job corresponding to the print content and the print setting information.

14. The print control system according to claim 13, wherein in a case where the voice device receives an utterance corresponding to an instruction to print a print content provided by a print service of the print management server system, the identifying unit is configured to identify print setting information for executing a printing process based on the print content provided by the print service, wherein the print setting information identified for the first content and the print setting information identified to execute the printing process based on the print content provided by the print service are same as each other.

15. The print control system according to claim 13, wherein in a case where the voice device receives an utterance corresponding to an instruction to print a print content provided by a print service of the print management server system, the identifying unit is configured to identify print setting information for executing a printing process based on the print content provided by the print service, wherein the print setting information identified for the first content and the print setting information identified to execute the printing process based on the print content provided by the print service are different from each other.

16. The print control system according to claim 13, wherein the print content provided by the print service is at least one of a coloring page content, a game content, or a five-line staff content.

17. The print control system according to claim 13, further comprising: an acquisition unit configured to acquire the first print content by using Uniform Resource Locator (URL) of the first print content and acquire the second print content by using Uniform Resource Locator (URL) of the second print content.

18. The print control system according to claim 13, wherein the voice device management server system comprises one or more servers and the print management server system comprises one or more servers.

19. A print control system, comprising:

a printing apparatus; and a print management server system configured to communicate with a voice device management server system;

the print management server system including an identifying unit configured to identify print setting information for first content acquired from the first print content generation service in a case where a voice device receives an utterance for giving an instruction for printing as a response to an audio output regarding the first print content generation service output from the voice device in a state where an utterance for using the print management server system is not received in the voice device, and configured to identify print setting information for second content acquired from the second print content generation service in a case where the voice device receives an utterance for giving an instruction for printing as a response to an audio output regarding the second print content generation service from the voice device in a state where an utterance for using the print management server system is not received in the voice device, wherein the print setting information identified for the first content and the print setting information identified for the second content are different from each other;

wherein the printing apparatus includes a print control unit configured to execute a printing process for a print job corresponding to the print content and the print setting information.

20. The print control system according to claim 19, wherein in a case where the voice device receives an utterance corresponding to an instruction to print a print content provided by a print service of the print management server system, the identifying unit is configured to identify print setting information for executing a printing process based on the print content provided by the print service, wherein the print setting information identified for the first content, the print setting information identified for the second content, and the print setting information identified to execute the printing process based on the print content provided by the print service are same as one another.

21. The print control system according to claim 19, wherein in a case where the voice device receives an utterance corresponding to an instruction to print a print content provided by a print service of the print management server system, the identifying unit is configured to identify print setting information for executing a printing process based on the print content provided by the print service, wherein the print setting information identified for the first content and the print setting information identified to execute the printing process based on the print content provided by the print service are different from each other.

22. The print control system according to claim 19, wherein the print content provided by the print service is at least one of a coloring page content, a game content, or a five-line staff content.

23. The print control system according to claim 19, further comprising: an acquisition unit configured to acquire the first print content by using Uniform Resource Locator (URL) of the first print content and acquire the second print content by using Uniform Resource Locator (URL) of the second print content.

24. The print control system according to claim 19, wherein the voice device management server system comprises one or more servers and the print management server system comprises one or more servers.

* * * * *